(12) United States Patent
Hoffmann et al.

(10) Patent No.: US 6,640,449 B1
(45) Date of Patent: Nov. 4, 2003

(54) CUTTING BLADE FOR A TRIMMER

(75) Inventors: Joachim Hoffmann, Piochingen (DE); Thomas Schweigert, Kemen (DE); Andreas Schneider, Weinstadt (DE)

(73) Assignee: Andreas Stihl AG & Co. (DE)

( * ) Notice: Subject to any disclaimer, the term of this patent is extended or adjusted under 35 U.S.C. 154(b) by 0 days.

(21) Appl. No.: 09/889,127

(22) PCT Filed: Jan. 7, 2000

(86) PCT No.: PCT/EP00/00068
§ 371 (c)(1),
(2), (4) Date: Nov. 5, 2001

(87) PCT Pub. No.: WO00/41554
PCT Pub. Date: Jul. 20, 2000

(30) Foreign Application Priority Data

Jan. 9, 1999 (DE) .................................. 299 00 270 U

(51) Int. Cl.⁷ .................................................. B26B 9/02
(52) U.S. Cl. ............................ 30/347; 56/255; 56/295; D8/8
(58) Field of Search ............................. 30/276, 347, 358, 30/353, 357; 56/255, 295; D8/8

(56) References Cited

U.S. PATENT DOCUMENTS

| | | | |
|---|---|---|---|
| 2,857,729 A | * 10/1958 | Zoldok | 56/295 |
| 2,869,311 A | 1/1959 | Beeston | 56/295 |
| 2,891,369 A | 6/1959 | Rietz | 56/295 |
| 3,003,298 A | 10/1961 | Wininger | 56/295 |
| 3,183,655 A | 5/1965 | Dunlap et al. | 56/295 |
| 3,686,841 A | 8/1972 | Hoffman et al. | 56/295 |
| 4,149,358 A | * 4/1979 | Comer | 56/295 |
| 4,310,999 A | * 1/1982 | Onoue | 56/295 |
| 4,617,788 A | 10/1986 | Sebastian | 56/295 |
| 5,615,542 A | 4/1997 | Thorud et al. | 56/255 |
| D389,382 S | * 1/1998 | Houle | D8/8 |
| 5,775,078 A | * 7/1998 | Warren | 56/255 |

FOREIGN PATENT DOCUMENTS

| FR | 1.532.050 | 8/1967 |
|---|---|---|
| FR | 2 606 585 A1 | 5/1988 |
| GB | 2 000 951 A | 1/1979 |

* cited by examiner

*Primary Examiner*—Hwei-Siu Payer
(74) *Attorney, Agent, or Firm*—R W Becker & Associates; R W Becker

(57) ABSTRACT

The present invention relates to a cutting blade for a trimmer. The cutting blade (1) comprises a base body (14) having a central portion (15) as well as end portions (16) adjoining the central portion. Cutting edges (26) are formed on the longitudinal edges (23,24) of the end portions (16), whereby a central fastening opening (21) is provided in the central portion (15) for mounting the cutting blade (11) on a drive shaft. In order to obtain a multiply cutting blade for chopping material, it is provided that the end portions (16) that carry the cutting edges (26) be angled off in the same direction (18) out of the plane (17) of the central portion (15).

10 Claims, 5 Drawing Sheets

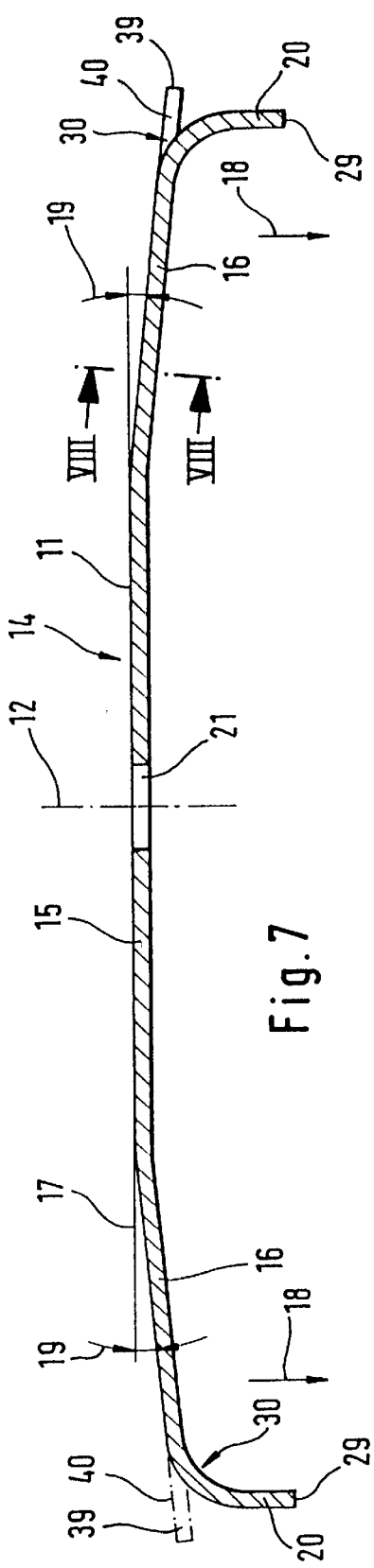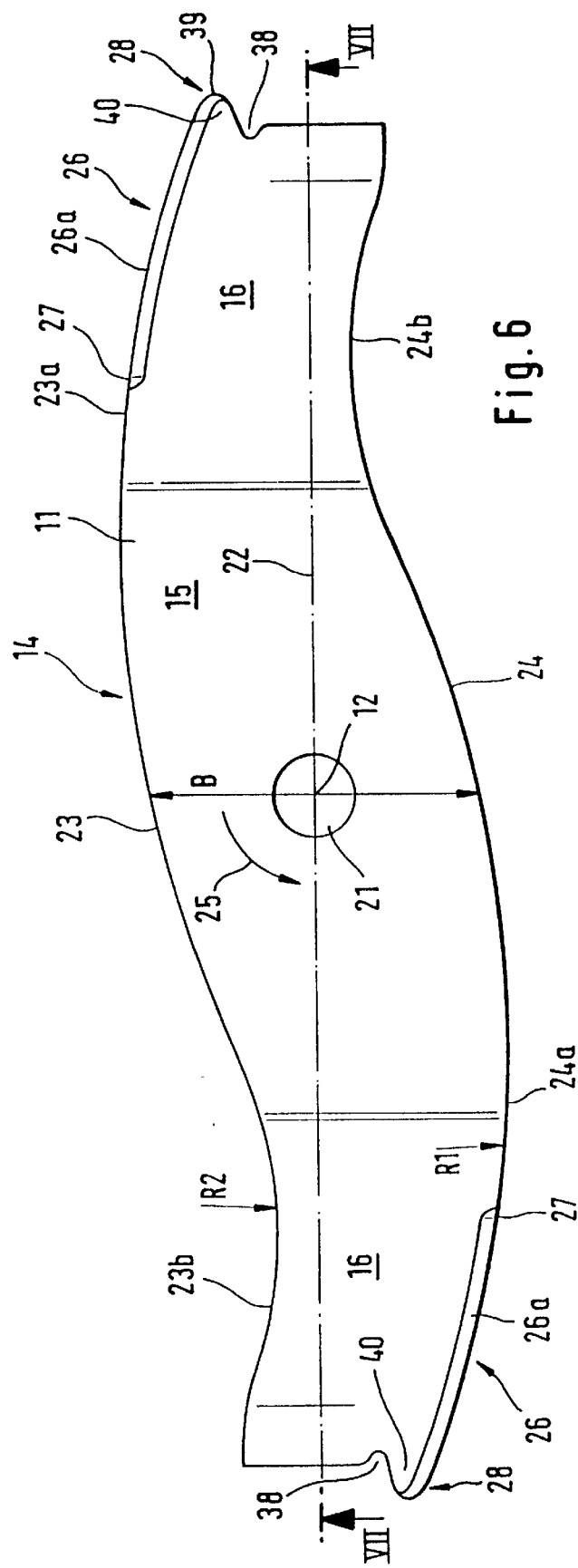

CUTTING BLADE FOR A TRIMMER

BACKGROUND OF THE INVENTION

Figure 1:
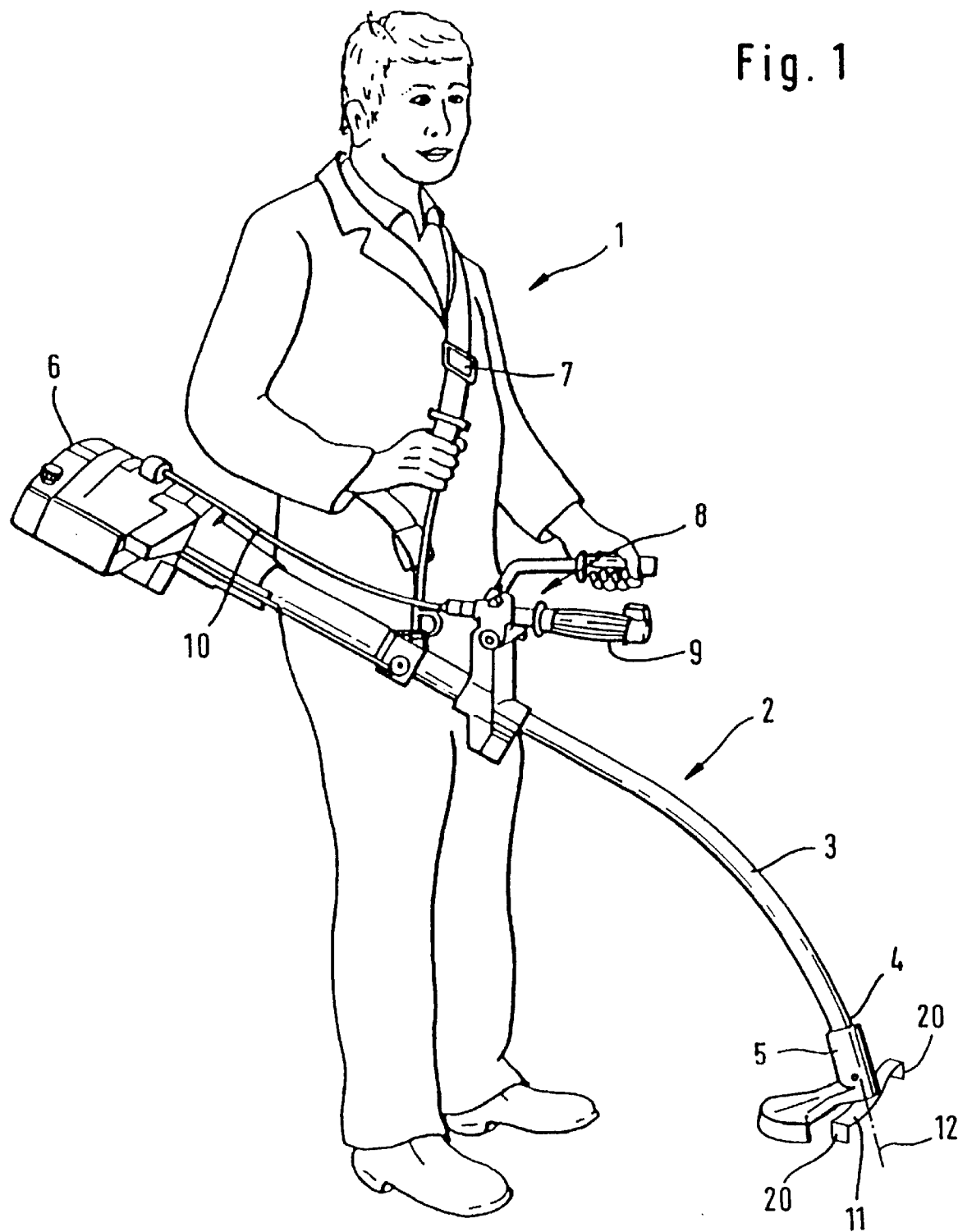

The present invention relates to a cutting blade for a trimmer or brush cutter.

Trimmers essentially comprise a guide tube, which is provided at one end with a cutter head and at the other end with a drive motor that drives the cutter head. The cutting tool in the cutter head is exchangeable, so that with different cutting blades, not only grass, weeds, reeds and bushes, but also thin trees can be cut. The cut material is generally collected and reduced in size at another location.

It is an object of the present invention to provide a cutting blade for a trimmer by means of which not only good cutting results can be achieved, but also at the same time a chopping of the cut material is achieved.

SUMMARY OF THE INVENTION

This object is inventively realized.

By angling off the end portions that carry the cutting edges, the effective cutting edge extends not only in the plane of rotation of the central portion, but also transverse to the plane of rotation over a height that can be prescribed.

As a result, stems, stalks, or the like are cut several times, in other words, are chopped.

Pursuant to an advantageous further embodiment of the present invention, the end portion is angled off several times, especially in two stages, in the same direction, resulting in a reduced amount of mass in the outer region of the blade. Consequently, there is achieved a higher inherent frequency of the cutting blade with otherwise high service life and low inertia.

To protect the vertical cutting edge at the blade end, a nose-shaped deflector is provided at the approximately horizontal end portion of the cutting blade and projects beyond the path of the blade end. This deflector protects the blade end from obstacles and also serves to protect the cutting edge to the extent that in the direction of rotation of the cutting blade, the deflector leads the blade end, i.e. the cutting edge thereof.

To achieve a good chopping effect, the effective cutting edge extends from the edge of the end portion that leads in the direction of rotation into the free, angled-off blade end, whereby the cutting edge ends in particular at the front end of the free blade end is disposed approximately parallel to the central portion. The cutting edge can be made continuous, or can be composed of two cutting edge portions.

If the horizontal cutting edge portion is inclined counter to the direction of rotation, and in particular has a curved configuration, the inner end of the horizontal cutting edge portion, which faces the axis of rotation, will, in the direction of rotation of the cutting blade, lead the outer end of the horizontal cutting edge portion. Thus, a deflecting effect is achieved upon encountering obstacles, thereby reducing the stress on the drive or gear mechanism as well as on the cutting blade. A further reduction of the stress is achieved in that at least the essentially vertical cutting edge portion is sharpened not only on the side facing the axis of rotation but also on the side remote from the axis of rotation.

Pursuant to an advantageous further embodiment of the present invention, the width of the base body, as measured in the plane of the central portion, is tapered from the region of the fastening opening to the bent or angled off free blade ends of the end portions. As a result, the amount of mass in the outer blade radius is reduced, which leads to an increased inherent frequency of the cutting blade and thus to a reduced dynamic stressing of the cutting blade. Due to the tapered configuration, the tortional rigidity of the blade ends is also reduced. The construction is preferably such that when the blade ends strike an obstacle, a portion of the impact energy is converted into deformation, thereby again lowering the stress of the gear mechanism in the cutter head.

The inventive cutting blade thus forms a chopping blade, which exhibits excellent cutting efficiency along with a long service life, low development of noise, and a high protective effect.

Further features of the present invention can be seen from the further claims, the specification, and the drawing, in which individually described specific embodiments of the invention are subsequently illustrated.

BRIEF DISCRIPTION OF THE DRAWING

Figure 3:
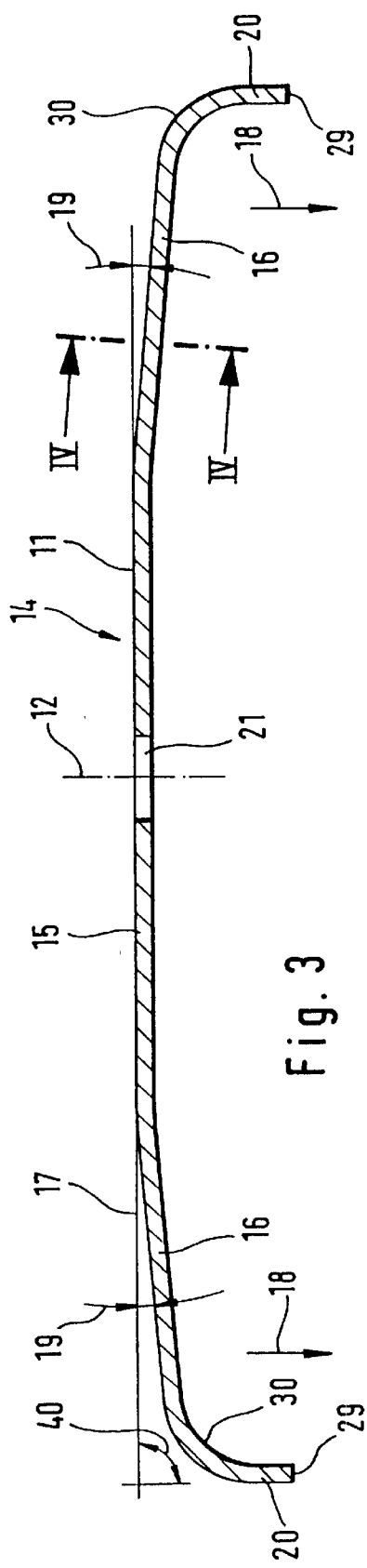
Figure 2:
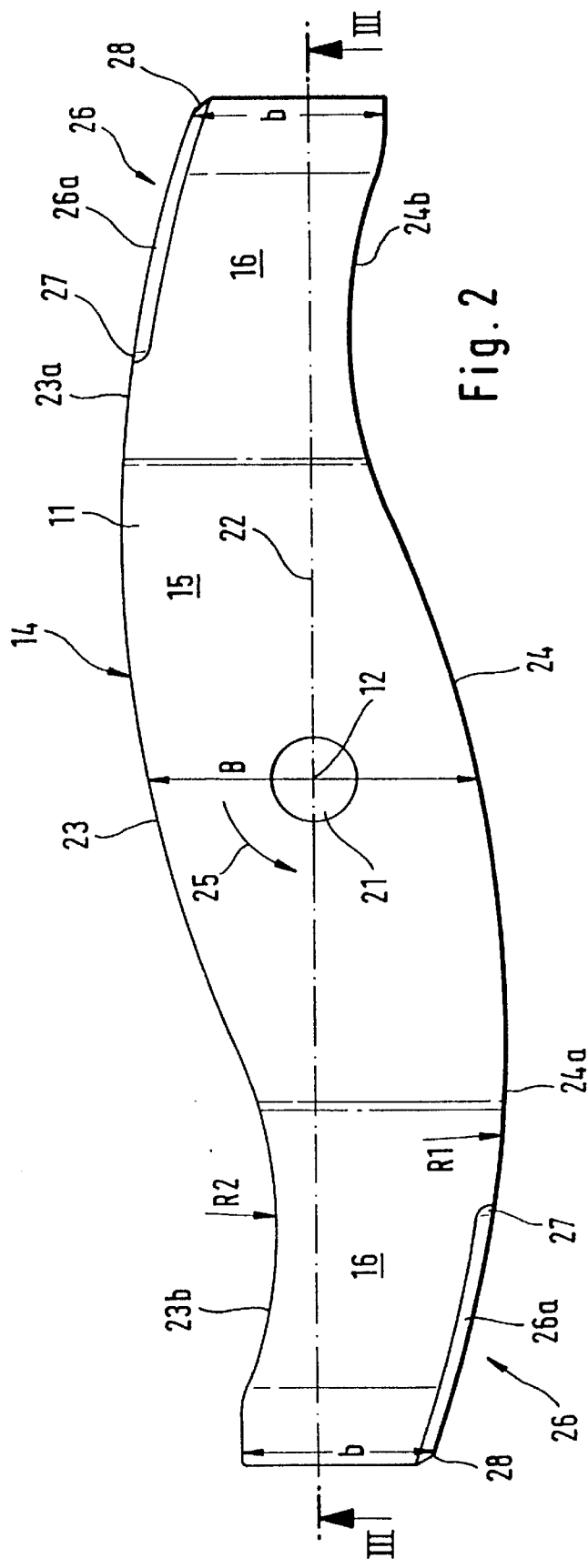
Figure 4:
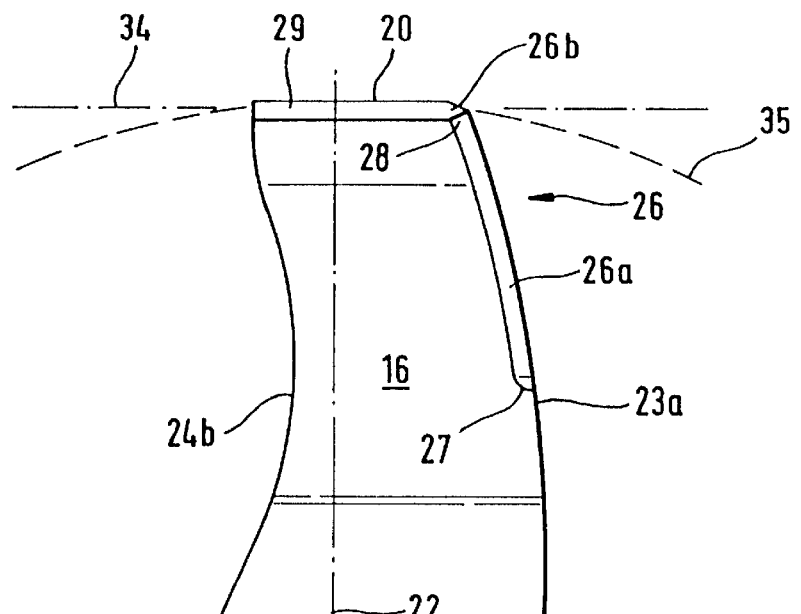
Figure 5:
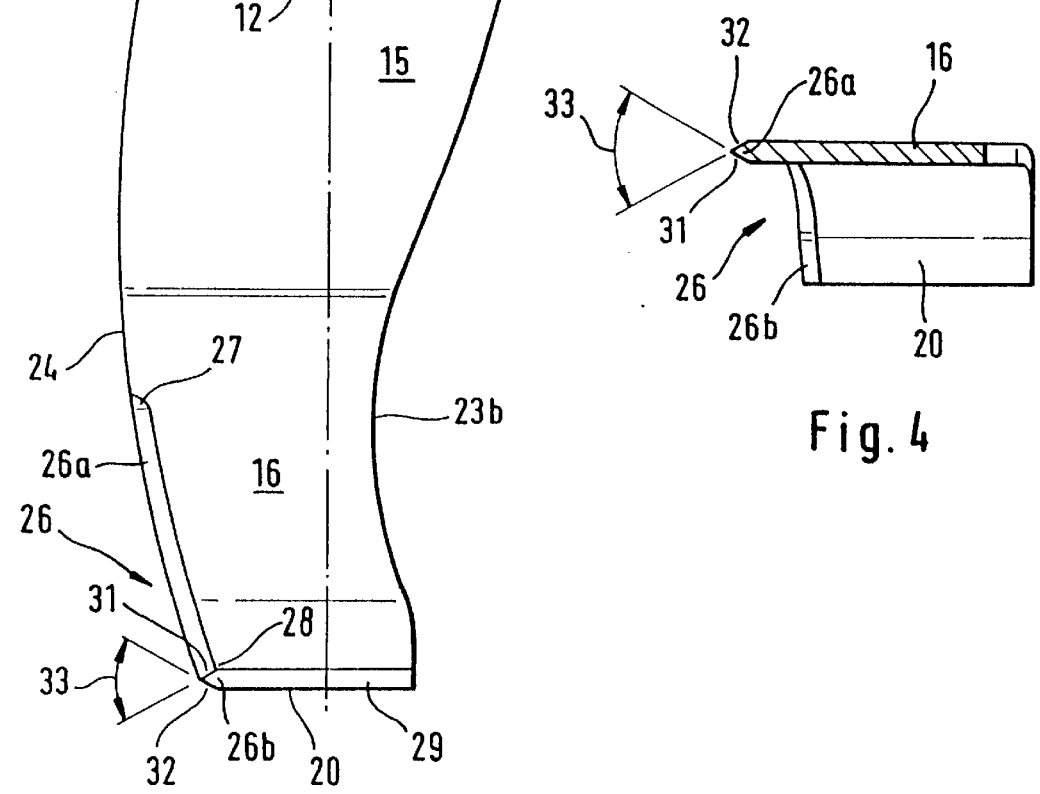
Figures 8, 9:
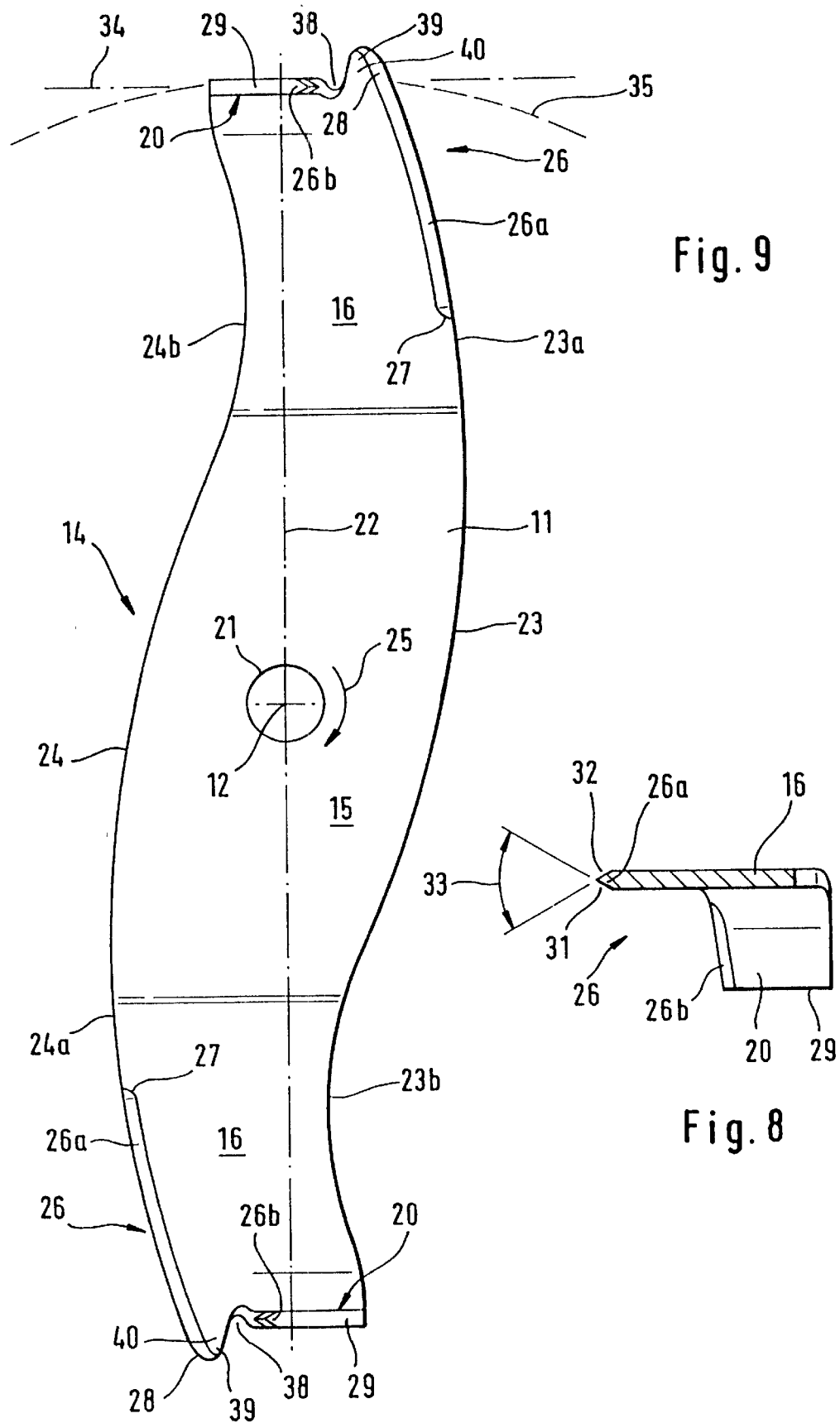

Shown are:

FIG. 1 is a schematic illustration of a trimmer carried by an operator and having an inventive cutting blade, FIG. 2 is a top view of the inventive cutting blade, FIG. 3 is a cross-sectional view through the cutting blade taken along the Line III—III in FIG. 2, FIG. 4 is a cross-sectional view through the cutting blade taken along the Line IV—IV in FIG. 3, FIG. 5 is a view of the cutting blade from below, FIG. 6 is a top view of a further exemplary embodiment of an inventive cutting blade, FIG. 7 is a cross-sectional view through the cutting blade of FIG. 6, taken along the Line VII—VII, FIG. 8 is a cross-sectional view through the cutting blade taken along the line Line VIII-VIII in FIG. 7, FIG. 9 is a view of the cutting blade of FIG. 6 from below.

DISCRIPTION OF PREFERRED EMBODIMENTS

FIG. 1 shows a brush cutter or trimmer 2 that is carried by an operator 1 and that essentially comprises a preferably curved guide tube 3 that at the lower end 4 is provided with a cutter head 5 and that at the upper end is provided with a drive motor 6. By means of a flexible shaft mounted in the guide tube, the drive motor 6 is connected to the cutter head. The drive motor can expediently be an internal combustion engine, especially a two-stroke engine, a fuel mixture lubricated four-stroke engine, or the like. It would also be possible to use an electric motor.

The trimmer 2 is carried by the operator 1 by means of a carrying strap 7, and is guided and held by means of a guide bar 8 that is secured to the guide tube 3. The guide bar 8 is provided with two handles, whereby one of the handles 9 is embodied as a throttle and is connected via a Bowden cable 10 or the like with the appropriate control elements of the drive motor 6.

Secured to the drive shaft, which projects out of the cutter head 5, is a cutting blade 11 that is rotatably driven about the axis of rotation 12. The cutting blade 11 is used as a chopping blade and is provided with two blade ends 20 that are bent away toward the ground.

The exact construction of exemplary embodiments of the cutting blade can be seen in detail from FIGS. 2–9.

The cutting blade 11 is made of metal, especially a hardened and tempered steel or steel plate. The base body 14 thereof comprises a central portion 15 with end portions that adjoin in the longitudinal direction of the central portion 15. As can be seen from FIG. 3, each end portion 16 is angled off downwardly in the same direction 18 from the plane 17 of the central portion 15. Each end portion 16 preferably forms an angle 19 with the plane 17 that in particular is approximately 2° to 20° or even more, being preferably 5° in the illustrated embodiment.

The free blade ends 20 of the end portions 16 are bent away more pronounced in the direction 18 than is the remainder of each end portion 16; in the illustrated embodiment, the blade ends 20 are disposed approximately parallel to the axis of rotation 12 of the drive shaft of the cutter head 5 (FIG. 1). The blade ends 20 are expediently disposed at an angle 40 of about 85° to 95, preferably at right angles to the plane 17 of the central portion 15. The end portions 16 are thus multiply angled off in the direction 18 relative to the ground, and namely in two stages.

As can be seen from the top view of FIG. 2, the central portion 15 has a central fastening opening 21, whereby the central portion 15 has the greatest width B transverse to a longitudinal axis 22 of the base body 14. In the region of the blade ends 20, the end portions 16 have a lesser width b, whereby the width B of the base body 14 tapers to the width b from the region of the fastening opening 21 to the bent away free blade ends 20 of the end portions 16. In so doing, as can be seen in the top view of FIG. 2, the base body 14 has an essentially slightly S-shaped contour with correspondingly curved longitudinal edges 23 and 24.

Relative to the direction of rotation 25 of the cutting blade 11, the leading edge portion 23a or 24a is curved essentially in the manner of an arc of a circle as a wave crest, while the trailing portion 23b or 24b forms a wave trough that extends in the manner of an arc of a circle. The leading edges 23a and 24a can be disposed at a considerably greater distance from the longitudinal axis 22 than are the trailing edges 23b and 24b.

Formed on the leading longitudinal edges 23a, 24a of each end portion 16 is a cutting edge portion 26a that is disposed essentially horizontally due to the small angle 19; in the direction of rotation 25 of the cutting blade 11, the inner end 27 of the cutting edge portion 26a that faces the axis of rotation 12 leads the outer end 28 of the cutting edge portion 26a. In so doing, the cutting edge portion 26a is curved in a slightly arc-shaped manner counter to the direction of rotation 25, whereby the radius of curvature R1 of the leading edge 23a or 24a is several times greater, especially three times greater, than the radius of curvature R2 of the trailing edge 23b or 24b.

As can be seen from FIGS. 4 and 5 of the first exemplary embodiment, the essentially horizontal cutting edge portion 26a merges into an essentially vertical, i.e. parallel to the axis of rotation 12, cutting edge portion 26b, whereby the transition in the curved region 30 (FIG. 1) the blade ends 20 is embodied as a continuous cutting edge. The vertical cutting edge portion 26b thus merges continuously into the approximately horizontal cutting edge portion 26a. The two cutting edge portions 26a, 26b form a common, continuous cutting edge 26. In this connection, the essentially horizontal cutting edge portion 26a of the end portion 16 leads the essentially vertical cutting edge portion 26b of the free blade end 20 in the direction of rotation 25. The cutting edge 26 respectively ends at the free front edge 29 of a blade end 20, which front edge is disposed approximately parallel to the central portion 15.

As can be seen from FIGS. 4 and 5, the vertical cutting edge portion 26b is sharpened not only on the inner side 31 that faces the axis of rotation 12, but also on the outer side 32 that faces away from the axis of rotation. The two sharpened side surfaces form an angle 33 of preferably 60°. The cutting edge 26 is expediently sharpened continuously on both sides over its entire length, so that also on the approximately horizontal cutting edge portion 26a the two sharpened side surfaces 31 and 32 form an angle 33 of expediently 60°.

The view from below of FIG. 5 clearly shows that the bent away blade ends 20 are planar and are disposed approximately in a plane 34 to which the longitudinal axis 22 of the cutting blade 11 is perpendicular. The blade ends 20 are thus disposed approximately tangential to their path 35 about the axis of rotation 12.

The specific embodiment of a cutting blade 11 as shown in FIGS. 6–9 differs from the cutting blade of FIGS. 2–5 essentially by the deflector 40, which is provided on the end portion 16 of the middle portion 15 approximately in the curved region 30. The deflectors 40 are nose-shaped and extend the end portion 16 beyond the plane 34 of the angled-off blade end 20. As shown in FIGS. 7 and 8, the nose-shaped deflector 40 is disposed in the plane of the end portion 16. The deflectors 40 project beyond the path 35 of the blade ends 20, i.e. their vertical end portions 26b, as a result of which the blade ends 20 are protected from butting against obstacles.

As can be seen from the top view of FIG. 6, the deflector 40 is arranged in a leading manner relative to the blade end 20 and its vertical cutting edge portion 26b in the direction of rotation 25 of the cutting blade 11.

As a further deviation from the first exemplary embodiment of a cutting blade 11 as shown in FIGS. 2–5, the effective cutting edge 26 of the cutting blade 11 of FIGS. 5 and 6 is formed, when viewed from the top, from intersecting cutting edge portions 26a and 26b. The horizontal cutting edge portion 26a extends into the tip 39 of the deflector 40, which forms the outer end 28 of the cutting blade. The vertical cutting edge portion 26b is formed on the leading edge of the angled-off blade end 20, whereby the cutting edge portion 26b ends in a groove 38 approximately at the level of the nose-shaped deflector 40.

In other respects, the construction corresponds to that of the cutting blade 11 of FIGS. 2–5, for which reason the same parts are provided with the same reference numerals.

The specification incorporates by reference the disclosure of German priority document 299 00 270.5 of Jan. 9, 1999 and International priority document PCT/EP00/00068 of Jan. 7, 2000.

The present invention is, of course, in no way restricted to the specific disclosure of the specification and drawings, but also encompasses any modifications within the Scope of the appended claims.

What is claimed is:

1. A cutting blade for a trimmer comprising:
a base body having a central portion adjoined, in a longitudinal direction, by respective end portions, which have longitudinal edges on which are provided cutting edges, wherein said central portion is provided with a central fastening opening for mounting said cutting blade on a drive shaft, wherein said end portions are angled off in at least two stages, in the same direction, out of a plane of said central portion, wherein each of said end portions forms an angle of about 2–20° with said plane of said central portion, wherein a respective blade end formed on each of said end portions is angled off approximately at right angles to said central portion, wherein an essentially horizontal cutting edge portion of each of said end portions, when viewed in a direction of rotation of said cutting blade, leads an essentially vertical cutting edge portion of said blade end, and wherein said horizontal cutting edge portion extends into a deflector that is formed on said end portion.

2. A cutting blade according to claim 1, wherein said essentially horizontal cutting edge portion extends counter to said direction of rotation in such a way that an inner end of said horizontal cutting edge portion that faces an axis of rotation of said cutting blade leads an outer end of said horizontal cutting edge portion when viewed in said direction of rotation.

3. A cutting blade for a trimmer comprising:

a base body having a central portion adjoined, in a longitudinal direction, by respective end portions, which have longitudinal edges on which are provided cutting edges, wherein said central portion is provided with a central fastening opening for mounting said cutting blade on a drive shaft, wherein said end portions are angled off in at least two stages, in the same direction, out of a plane of said central portion, wherein each of said end portions forms an angle of about 2–20° with said plane of said central portion, wherein a respective blade end formed on each of said end portions is angled off approximately at right angles to said central portion, wherein a respective nose-shaped deflector is formed on each end portion, and wherein said deflector projects beyond a path of travel of said blade end.

4. A cutting blade according to claim 3, wherein said blade end is a planer.

5. A cutting blade according to claim 3, wherein said deflector leads said blade end in a direction of rotation of said cutting blade.

6. A cutting blade according to claim 3, wherein each of said cutting edges extends a leading edge of said end portion, as viewed in a direction of rotation of said cutting blade, into said angled off blade end.

7. A cutting blade according to claim 6, wherein said cutting edge ends at a free front edge is disposed approximately parallel to said central portion.

8. A cutting blade according to claim 3, wherein an essentially horizontal cutting edge portion of each of said end portion, when viewed in a direction of rotation of said cutting blade, leads an essentially vertical cutting edge portion of said blade end.

9. A cutting blade according to claim 3, wherein a width of said base is tapered from a region of said fastening opening to said angled off blade end portions, and wherein when viewed from the top of said central portion, said longitudinal edges of said end portions extend in a slightly S-shaped manner.

10. A cutting blade according to claim 9, wherein a leading portion of said longitudinal edges of said end portions are curved with a larger radius than are trailing portions of said longitudinal edges.

* * * * *